United States Patent
Gao et al.

(10) Patent No.: US 11,426,713 B1
(45) Date of Patent: Aug. 30, 2022

(54) MONOLITHIC CATALYST AND PREPARATION METHOD AND USE THEREOF

(71) Applicant: Zhejiang Tianlan Environmental Protection Technology Co., Ltd., Zhejiang (CN)

(72) Inventors: Shan Gao, Zhejiang (CN); Zhongbiao Wu, Zhejiang (CN); Yuejun Wang, Zhejiang (CN); Haibo Ni, Zhejiang (CN); Dongjie Ge, Zhejiang (CN); Ziwei Zhou, Zhejiang (CN)

(73) Assignee: Zhejiang Tianlan Environmental Protection Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/567,109

(22) Filed: Dec. 31, 2021

(51) Int. Cl.
| | |
|---|---|
| *B01J 29/74* | (2006.01) |
| *B01J 37/08* | (2006.01) |
| *B01J 37/02* | (2006.01) |
| *B01J 35/00* | (2006.01) |
| *B01J 37/00* | (2006.01) |
| *B01D 53/86* | (2006.01) |
| *B01J 21/16* | (2006.01) |

(52) U.S. Cl.
CPC ...... *B01J 29/7415* (2013.01); *B01D 53/8687* (2013.01); *B01J 21/16* (2013.01); *B01J 35/0006* (2013.01); *B01J 37/009* (2013.01); *B01J 37/0063* (2013.01); *B01J 37/0213* (2013.01); *B01J 37/0217* (2013.01); *B01J 37/0246* (2013.01); *B01J 37/082* (2013.01); *B01D 2255/1021* (2013.01); *B01D 2255/1023* (2013.01); *B01D 2255/1026* (2013.01); *B01D 2255/2065* (2013.01); *B01D 2255/502* (2013.01); *B01D 2255/9022* (2013.01); *B01J 2229/186* (2013.01)

(58) Field of Classification Search
None
See application file for complete search history.

(56) References Cited

U.S. PATENT DOCUMENTS

2015/0125665 A1* 5/2015 Nakase ................. B32B 5/145
156/308.6

FOREIGN PATENT DOCUMENTS

| CN | 104525242 A | | 4/2015 |
|---|---|---|---|
| CN | 103318911 | * | 6/2015 |
| CN | 107824217 A | | 3/2018 |
| CN | 108264056 A | | 7/2018 |
| CN | 108421559 A | | 8/2018 |

* cited by examiner

*Primary Examiner* — Sheng H Davis

(57) ABSTRACT

The present application discloses a monolithic catalyst with the function of selective adsorption-catalytic oxidation of organic waste gas and a preparation method and application thereof. The present application adopts a double coating design. A first coating is a molecular sieve primer coating. A second coating is an active component coating, which uses a neutral silica sol, so as to protect the activity and effectiveness of a noble metal and a catalytic promoter on the molecular sieve.

10 Claims, No Drawings

MONOLITHIC CATALYST AND PREPARATION METHOD AND USE THEREOF

STATEMENT REGARDING PRIOR DISCLOSURES BY AN INVENTOR OR JOINT INVENTOR

The contents of Chinese Patent Application No. 202010842651.0 filed on Aug. 20, 2020 and published on Jan. 5, 2021, is a grace period disclosure and shall not be prior art to claimed invention.

TECHNICAL FIELD

The present application relates to a technical field of flue gas treatment, and, in particular to a monolithic catalyst and a preparation method and application therefor.

BACKGROUND ART

A catalytic oxidation method is an effective means of eliminating volatile organic compounds (VOCs) emitted by industry. VOCs molecules are adsorbed on a surface of the catalyst and activated, and undergoes a rapid oxidization with $O_2$ at a lower temperature. Product molecules $CO_2$ and $H_2O$ are desorbed from the surface of the catalyst. It is high effective, stable and clean. In a catalytic combustion technology, the catalyst is a key factor, and its performance has a decisive effect on VOCs treatment efficiency and energy consumption. A noble metal catalyst is the widely used catalyst in the catalytic combustion, which has high activity and good selectivity. The catalysts includes monolithic catalysts and granular catalyst according to shapes of the catalysts. The monolithic catalyst is widely used in the catalytic combustion technology for the organic waste gas treatment because of its advantages of low pressure drop, high mechanical strength, wear resistance and heat shock resistance.

The specification of China patent publication No. CN 108264056 A discloses a method for synthesizing all-silicon Beta zeolite molecular sieve by sodium-free solvent-free route, and the specification of china patent publication No. CN 108421559 A discloses the all-silicon Beta molecular sieve catalyst for room temperature formaldehyde purification and preparation method thereof. However, there are still lots of problems to be overcome on how to well apply the existing all-silicon molecular sieve system catalyst to the monolithic catalyst. These problems includes: how to improve coating load of the all-silicon molecular sieve system catalyst, how to improve adhesion strength and reduce falling out rate of the all-silicon molecular sieve system catalyst, how to make the all-silicon molecular sieve system catalyst still keep good VOCs catalytic oxidation performance when coated on a carrier of the monolithic catalyst without being inactivated due to addition of additives, etc. These are the obstacles, which have not been overcome and hinder the achievement of the application of the all-silicon molecular sieve system catalyst in industrial monolithic catalyst.

A preparation method and coating method of molecular sieve coating is disclosed in China patent application No. CN201410792976.7, in which the molecular sieve coating is prepared by coating the molecular sieve on the surface of the carrier mainly by using $Al_2O_3$—$ZrO_2$ composite sol. This method is universal for different molecular sieves, and is not specific for a certain kind of molecular sieves. But for an all-silicon molecular sieve, this method introduces hydrophilic $Al_2O_3$ sol, which affects its advantage of hydrophobicity.

A coating slurry prepared by a Cu precursor, the molecular sieve and a silica sol is disclosed in China patent application No. CN201710980286.8, in which one-step coating is carried out. The slurry prepared by this method suffers from layer separation, and is not suitable for production of VOCs catalyst.

SUMMARY

In view of incompatibility between existing monolithic catalyst coating technologies and the all-silicon molecular sieve system catalyst, the present application provides a preparation method of a monolithic catalyst with a function of selective adsorption-catalytic oxidation of organic waste gas. The obtained monolithic catalyst has high loading rate of a surface coating, good firmness and low falling out rate, which significantly improves mechanical strength and service life of the monolithic catalyst. The monolithic catalyst in the present application can selectively adsorb VOCs and generated $H_2O$ can be desorbed at the same time, so as to promote reaction to the direction of VOCs catalytic oxidation, which has excellent VOCs catalytic oxidation performance.

The preparation method of a monolithic catalyst with a function of selective adsorption-catalytic oxidation of organic waste gas includes steps as follow:

(1) pretreating a cordierite carrier by immersing in tetraethyl ammonium hydroxide solution for 2-3 hours, and then drying;

(2) mixing alkaline silica sol and trimethoxysilane by a mass ratio of 2.5-10:1 to form a stable sol, adding an all-silicon Beta molecular sieve (hereafter abbreviated as all-silicon molecular sieve), and wet grinding to particle size below 500 nm on a ball mill to prepare a first coating slurry, in which the mass ratio of the all-silicon Beta molecular sieve to the alkaline silica sol is 1:4-15; and immersing the cordierite carrier obtained by drying in step (1) in the first coating slurry, taking out and blowing to remove residual slurry in a pore, drying, and calcining at 300-400° C. for 3-8 hours to prepare a first coating catalyst; and (3) mixing neutral silica sol and a dispersant by a mass ratio of 25-50:1, adding an all-silicon Beta molecular sieve noble metal catalyst, and wet grinding to particle size below 500 nm on the ball mill to prepare a second coating slurry, in which the mass ratio of the all-silicon Beta molecular sieve in the all-silicon Beta molecular sieve noble metal catalyst to the neutral silica sol is 1:3-10; and immersing the first coating catalyst obtained in step (2) in the second coating slurry, taking out and blowing to remove residual slurry in the pore, drying, and calcining at 300-400° C. for 3-8 hours to prepare the monolithic catalyst with the function of selective adsorption-catalytic oxidation of organic waste gas.

Preferably, in step (1), mass concentration of the tetraethyl ammonium hydroxide is 1%-5%.

Preferably, in step (2), pH of the alkaline silica sol is 9-10.

The all-silicon Beta molecular sieve and the all-silicon Beta molecular sieve carrier in the preparation method of the present application can be synthesized by adopting organic-template-free seed method, for example, prepared according to the method disclosed in China patent publication No. CN 108264056 A.

Preferably, in step (2), the all-silicon Beta molecular sieve is a wet material, which is synthesized by adopting organic-template-free seed method including crystallizing for 12-24 hours and suction filtering.

Preferably, in step (3), the dispersant is polyethylene glycol and/or polypropylene glycol.

Preferably, in step (3), the all-silicon Beta molecular sieve noble metal catalyst comprises all-silicon Beta molecular sieve carrier and a noble metal and a catalytic promoter carried on the all-silicon Beta molecular sieve carrier.

Preferably, the all-silicon Beta molecular sieve carrier is synthesized by adopting organic template-free seed method, including crystallizing for 12-24 hours to obtain a product, washing the product to neutral with deionized water, suction filtering and drying.

Preferably, the noble metals include noble metal I and noble metal II with a molar ratio of 1-5:1, the noble metal I is ruthenium, and the noble metal II is platinum and/or palladium.

Preferably, the catalytic promoter is an oxide of an auxiliary element, and the auxiliary element is at least one of the cerium, lanthanum, copper, and manganese.

Further preferably, based on a total mass of the all-silicon Beta molecular sieve noble metal catalyst as 100%, the total mass ratio of the noble metal is 0.01%-0.5%, and the total mass ratio of the auxiliary elements is 0.1%-5%.

Preferably, a preparation method of the all-silicon Beta molecular sieve noble metal catalyst adopts an immersion method, including immersing the all-silicon Beta molecular sieve in the solution containing a noble metal precursor and a catalytic promoter precursor for 1-2 hours, suction filtering, drying, and calcining at 300-500° C. for 2-4 hours.

Preferably, the noble metal precursor is at least one of noble metal chloride and noble metal nitrate.

The catalytic promoter precursor is nitrate of the auxiliary element.

The present application also provides a monolithic catalyst with a function of selective adsorption-catalytic oxidation of organic waste gas obtained by this preparation method, including the cordierite carrier and a surface coating. The ratio of a loading mass of the surface coating to the mass of the cordierite carrier is not less than 8%, and the falling off rate of the surface coating is not more than 1%.

The present application further provides the use of a monolithic catalyst in catalytic oxidation treatment of organic waste gas.

The all-silicon molecular sieve used in the present application has the function of selective adsorption. During the catalytic oxidation of organic waste gas, $H_2O$ in the organic waste gas and $H_2O$ generated after VOCs are oxidized will compete for adsorption with an organism, which inhibits catalytic activity. Such molecular sieves preferentially selectively adsorb VOCs, and play a hydrophobic function, which can quickly and efficiently reduce possibility of the competitive adsorption between $H_2O$ and VOCs, so as to realize the catalyst selective adsorption-catalytic adsorption of the organic waste gas.

However, the all-silicon Beta molecular sieve has poor hydrophilicity, and has distinct physical and chemical properties over conventional molecular sieves. It will be difficult to evenly coat such molecular sieve or molecular sieve catalyst on the cordierite carrier by a coating method currently disclosed. Therefore, the present application provides a coating method and formula suitable for the molecular sieve, while providing a selective adsorption-catalytic oxidation VOCs catalyst having excellent catalytic degradation performance, which can achieve a high conversion rate even at the presence of low loading amount of noble metals.

Compared with the existing technology, the main advantages are as follows.

(1) Double coating design is adopted. The first coating is a molecular sieve primer coating, which ensures adhesive property and firmness of coating between the molecular sieve and the cordierite carrier. The second coating is an active component coating, which uses the neutral silica sol to protect the activity and effectiveness of noble metals and catalytic promoter on the molecular sieve.

(2) The prepared catalyst product has excellent selective adsorption property, effectively adsorbs VOCs, and rapidly desorb $H_2O$ generated upon catalytic oxidation to expose a new active site for the degradation of a next VOCs molecule.

(3) The prepared catalyst product can achieve a high conversion efficiency of VOCs even at the presence of a low loading amount of a noble metal, especially suitable for the catalytic oxidation of some hydrophobic VOCs (such as phenenes, alkanes and alkenes).

DETAILED DESCRIPTION

The present application will be further described below in combination with examples. It should be understood that, these examples are only used to illustrate the present application, but not intended to limit the protection scope of the present application. The operation method without specific conditions illustrating in the following examples is usually performed under conventional conditions or a condition recommended by a manufacturer.

For the monolithic catalysts in the following examples and comparative examples, a method for computing a loading rate is: the loading rate=a loading mass of a surface coating/mass of a cordierite carrier×100%. The method of computing a falling off rate is: the falling off rate=(the mass of the monolithic catalyst before a falling off test−the mass of the monolithic catalyst after a falling off test)/the loading mass of the surface coating×100%. The falling off test method is as follows. The coated catalyst is placed into an ultrasonic cleaner, so as to measure the falling off rate of the coating. A sample before and after ultrasound treatment are oven dried at 80° C. for 2 hours, and then calcined at 300° C. for 2 hours in a muffle furnace.

Example 1

(1) All-silicon Beta molecular sieves were synthesized by an organic template-free seed method, in which crystallization time was 24 hours. Some of the products were washed to neutral with deionized water and then suction filtered and dried (dry material A), and some of the products were merely subjected to suction filtration, without being dried (wet material B).

(2) The dry material A was immersed in a saline solution consisting of ruthenium (III) chloride, palladium nitrate dihydrate, platinum (II) nitrate and cerium (III) nitrate hexahydrate by an impregnation method for 1 hour, and then suction filtered and dried, and calcined at 300° C. for 4 hours to obtain a molecular sieve catalyst. The mass of Pu, Pd, Pt and Ce (calculated by elemental mass) was 0.4%, 0.05%, 0.05% and 0.1% of the mass of the molecular sieve catalyst respectively.

(3) The cordierite carrier was pretreated by immersing in 2 wt % of tetraethyl ammonium hydroxide solution for 2 hours, taken out, and then dried.

(4) A first coating was coated. An alkaline silica sol (pH=9~10) and trimethoxysilane were mixed to form a stable sol, added with the wet material B, and wet ground on a ball mill to particle size of 500 nm or below to prepare a first coating slurry. The mass ratio of trimethoxysilane to the alkaline silica sol was 1:4, and the mass ratio of the wet material B (calculated by the mass of the all-silicon Beta molecular sieve) to the alkaline silica sol was 1:5. The pretreated cordierite carrier was immersed in the first coating slurry, taken out, blown by using stable airflow to remove the residual slurry in pores dried, and calcined at 400° C. for 4 hours to prepare a first coating catalyst.

(5) A second coating was coated. An neutral silica sol and dispersant polyethylene glycol were mixed to form the sable sol, added with the prepared molecular sieve catalyst, and wet ground on the ball mill to particle size 500 nm or below to prepare a second coating slurry. The mass ratio of the dispersant to the neutral silica sol was 1:30, and the mass ratio of the molecular sieve catalyst (calculated by the mass of the dry material A) to the neutral silica sol was 1:4. The prepared first coating catalyst was immersed in the second coating slurry, taken out, blown by using the stable airflow to remove residual slurry in the pores, dried, calcined at 400° C. for 4 hours to prepare the monolithic catalyst with the function of selective adsorption-catalytic oxidation of organic waste gas.

The prepared monolithic catalyst had a loading rate of 10.3 wt %, and a falling off rate of 0.17 wt %. Under a condition of airspeed 20,000 $h^{-1}$, purification efficiencies of benzene, toluene, xylene and ethyl acetate are 99% or higher at 224° C., 196° C., 193° C. and 275° C. respectively.

Comparative Example 1

The example differs from Example 1 only in that the first coating wet material B was coated by the coating method for the second coating, and the other conditions were the same as in Example 1. The loading rate of the prepared monolithic catalyst was <5 wt %, and the falling off rate was >5 wt %.

Comparative Example 2

The example differs from the Example 1 only in that the second coating molecular sieve catalyst was coated by the coating method for the first coating, and the other conditions were the same as in Example 1. The prepared monolithic catalyst was tested for activity under the same conditions as those for the catalyst prepared in Example 1, and the purification efficiencies of benzene, toluene, xylene and ethyl acetate were <50% at 224° C., 196° C., 193° C. and 275° C. respectively.

Comparative Example 3

The example differs from the example 1 only in that the step (3) was omitted or the pretreatment was carried out with same concentration of sulfuric acid, nitric acid or sodium hydroxide the etc, and the other conditions was the same as in Example 1. The loading rate of the prepared monolithic catalyst was <5 wt %, and the falling off rate was >2 wt %.

Example 2

(1) All-silicon Beta molecular sieves were synthesized by the organic template-free seed method, in which crystallization time was 18 hours. Some of the products were washed to neutral with deionized water and then suction filtered and dried (dry material A), and some of the products were subjected to suction filtration, without being dried (wet material B).

(2) The dry material A was immersed in a saline solution consisting of ruthenium (III) chloride, palladium nitrate dihydrate, lanthanum nitrate and manganous nitrate by the impregnation method for 2 hours, suction filtered, dried, and calcined at 300° C. for 3 hours to obtain the molecular sieve catalyst. The mass of Ru and Pd (calculated by elemental mass) was 0.15%, 0.10%, 0.5% and 0.5% of the mass of the molecular sieve catalyst respectively.

(3) The cordierite carrier was pretreated by immersing in 3 wt % of tetraethyl ammonium hydroxide solution for 2 hours, taken out and then dried.

(4) The alkaline silica sol (pH=9-10) and trimethoxysilane were mixed to form the stable sol, added with the wet material B, and wet ground on the ball mill to particle size of 500 nm or below to prepare the first coating slurry. The mass ratio of trimethoxysilane to the alkaline silica sol was 1:6, and the mass ratio of the wet material B (calculated by the mass of the all-silicon Beta molecular sieve) to the alkaline silica sol was 1:10. The pretreated cordierite carrier was immersed in the first coating slurry, blown by using the stable airflow to remove the residual slurry in the pores, dried, and calcined at 400° C. for 3 hours to prepare the first coating catalyst.

(5) The neutral silica sol and dispersant polypropylene glycol were mixed to form the sable sol, added with the prepared molecular sieve catalyst, and wet ground on the ball mill to particle size of 500 nm or below to prepare the second coating slurry. The mass ratio of the dispersant to the neutral silica sol was 1:50, and the mass ratio of the molecular sieve catalyst (calculated by the mass of the dry material A) to the neutral silica sol was 1:4. The prepared first coating catalyst was immersed in the second coating slurry, taken out, blown by using the stable airflow to remove residual slurry in the pores, dried, and calcined at 400° C. for 3 hours.

The prepared monolithic catalyst had a loading rate of 9.7 wt % and a falling off rate of 0.15 wt %. Under a condition of airspeed 20,000 $h^{-1}$, the purification efficiencies of benzene, toluene, xylene and ethyl acetate were 99% or higher at 232° C., 209° C., 204° C. and 281° C. respectively.

Example 3

(1) All-silicon Beta molecular sieves were synthesized by the organic template-free seed method, in which crystallization time was 12 hours. Some of the products were washed to neutral with deionized water, suction filtered and dried (dry material A), and some of the products were subjected to suction filtration, without being dried (wet material B).

(2) The dry material A was immersed in a saline solution consisting of ruthenium (III) chloride, platinum (II) nitrate, cerium (III) nitrate hexahydrate and manganous nitrate by the impregnation method for 2 hours, suction filtered, dried, and calcined at 300° C. for 3 hours to obtain the molecular sieve catalyst. The mass of Ru, Pd and Pt (calculated by elemental mass) was 0.05%, 0.05%, 1.5% and 1.0% of the mass of the molecular sieve catalyst respectively.

(3) The cordierite carrier was pretreated by immersing in 5 wt % of tetraethyl ammonium hydroxide solution for 3 hours, then taken out, and dried.

(4) The alkaline silica sol (pH=9-10) and trimethoxysilane were mixed to form the stable sol, added with the wet material B, and wet ground on the ball mill to particle size of 500 nm or below to prepare the first coating slurry. The mass ratio of trimethoxysilane to the alkaline silica sol was 1:8, and the mass ratio of the wet material B to the alkaline silica sol was 1:4. The pretreated cordierite carrier was immersed in the first coating slurry, taken out, blown by using the stable airflow to remove the residual slurry in the pores, dried, and calcined at 300° C. for 4 hours to prepare the first coating catalyst.

(5) The neutral silica sol and polypropylene glycol were mixed to form the sable sol, added with the prepared molecular sieve catalyst, and wet ground on the ball mill to particle size of 500 nm or below to prepare the second coating slurry. The mass ratio of the dispersant to the neutral silica sol was 1:30, and the mass ratio of the molecular sieve catalyst (calculated by the mass of the dry material A) to the neutral silica sol was 1:5. The prepared first coating catalyst was immersed in the second coating slurry, taken out, blown by using the stable airflow to remove the residual slurry in the pores, dried, and calcined at 300° C. for 4 hours.

The prepared monolithic catalyst had a loading rate of 9.4 wt %, and a falling off rate of 0.11 wt %. Under a condition of airspeed 20,000 h$^{-1}$, the purification efficiencies of benzene, toluene, xylene and ethyl acetate were more than 99% at 237° C., 213° C., 216° C. and 295° C. respectively.

It should be understood that after reading the above description of the present application, those skilled in the art can make various changes and modifications to the present application, and these equivalent forms should be also considered as falling within the scope limited by the claims appended in the present application.

What is claimed is:

1. A preparation method of a monolithic catalyst, comprising steps of:
    (1) pretreating a cordierite carrier by immersing in tetraethyl ammonium hydroxide solution for 2-3 hours, taking out and drying;
    (2) mixing an alkaline silica sol with trimethoxysilane by a mass ratio of 2.5-10:1 to form a stable sol, adding an all-silicon Beta molecular sieve, and wet grinding to particle size of 500 nm or below on a ball mill to prepare a first coating slurry, wherein the mass ratio of the all-silicon Beta molecular sieve to the alkaline silica sol is 1:4-15; and
    immersing the cordierite carrier obtained after drying in step (1) in the first coating slurry, taking out, blowing to remove residual slurry in pores, drying, and calcining at 300-400° C. for 3-8 hours, so as to prepare a first coating catalyst; and
    (3) mixing a neutral silica sol with a dispersant by a mass ratio of 25-50:1, adding an all-silicon Beta molecular sieve noble metal catalyst comprising an all-silicon Beta molecular sieve carrier and noble metals and a catalytic promoter carried on the all-silicon Beta molecular sieve carrier, and wet grinding to particle size of 500 nm or below on the ball mill to prepare a second coating slurry, wherein
    a mass ratio of the all-silicon Beta molecular sieve carrier in the all-silicon Beta molecular sieve noble metal catalyst to the neutral silica sol is 1:3-10; and
    immersing the first coating catalyst obtained in step (2) in the second coating slurry, and taking out, blowing to remove residual slurry in pores, drying, and calcining at 300-400° C. for 3-8 hours to prepare the monolithic catalyst with the function of selective adsorption-catalytic oxidation of organic waste gas.

2. The preparation method according to claim 1, wherein, in step (1), a mass concentration of the tetraethyl ammonium hydroxide is 1%-5%.

3. The preparation method according to claim 1, wherein, in step (2), pH value of the alkaline silica sol is 9-10.

4. The preparation method according to claim 1, wherein, in step (2), the all-silicon Beta molecular sieve is a wet material synthesized by using organic template-free seed method comprising crystallizing for 12-24 hours and suction filtering.

5. The preparation method according to claim 1, wherein, in step (3), the dispersant is one or two selected from a group consisting of polyethylene glycol and polypropylene glycol; and
    the all-silicon Beta molecular sieve carrier is synthesized by using a seed method in the absence of an organic template comprising crystallizing for 12-24, washing with deionized water to neutral, suction filtering, and drying;
    the noble metals comprise noble metal I and noble metal II with a molar ratio of 1-5:1, the noble metal I is ruthenium, and the noble metal II is platinum and/or palladium; and
    the catalytic promoter is an oxide of an auxiliary element, and the auxiliary element is at least one selected from a group consisting of the cerium, lanthanum, copper, and manganese.

6. The preparation method according to claim 5, wherein, based on a total mass of the all-silicon Beta molecular sieve noble metal catalyst as 100%, the total mass ratio of the noble metal is 0.01%~0.5%, and the total mass ratio of the auxiliary elements is 0.1%~5%.

7. The preparation method according to claim 1, wherein, a preparation method of the all-silicon Beta molecular sieve noble metal catalyst is an immersion method comprising immersing the all-silicon Beta molecular sieve in a solution containing a noble metal precursor and a catalytic promoter precursor for 1-2 hours, suction filtering, drying, and calcining at 300-500° C. for 2-4 hours.

8. The preparation method according to claim 7, wherein, the noble metal precursor is at least one selected from a group consisting of noble metal chloride and noble metal nitrate.

9. A monolithic catalyst prepared according to the preparation method of claim 1, comprising a cordierite carrier and a surface coating made from the first coating slurry and the second coating slurry, wherein, a ratio of a loading mass of the surface coating to the mass of the cordierite carrier is not less than 8%, and a falling off rate of the surface coating is not more than 1%.

10. Use of the monolithic catalyst according to claim 9 in catalytic oxidation treatment of organic waste gas.

* * * * *